(12) United States Patent
Borgatti et al.

(10) Patent No.: US 8,425,220 B2
(45) Date of Patent: Apr. 23, 2013

(54) MOULDING UNIT FOR A PLANT FOR BLOW-MOULDING PLASTIC CONTAINERS, PARTICULARLY BOTTLES

(75) Inventors: Maurizio Borgatti, Imola (IT); Massimo Morovingi, Imola (IT); Fiorenzo Parrinello, Medicina (IT); Emilio Re, Ancona (IT); Gabriele Stocchi, Parma (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 328 days.

(21) Appl. No.: 13/055,749

(22) PCT Filed: Jul. 29, 2009

(86) PCT No.: PCT/IB2009/053302
§ 371 (c)(1),
(2), (4) Date: Jan. 25, 2011

(87) PCT Pub. No.: WO2010/013208
PCT Pub. Date: Feb. 4, 2010

(65) Prior Publication Data
US 2011/0123666 A1   May 26, 2011

(30) Foreign Application Priority Data
Jul. 29, 2008   (IT) .............................. BO2008A0473

(51) Int. Cl.
*B29C 49/12*   (2006.01)

(52) U.S. Cl.
USPC ........................... 425/182; 29/401.1; 425/529

(58) Field of Classification Search ................ 29/401.1; 425/182, 529
See application file for complete search history.

(56) References Cited

U.S. PATENT DOCUMENTS

| 5,269,672 A | 12/1993 | DiGangi, Jr. |
| 5,403,177 A * | 4/1995 | Priest ............................ 425/529 |
| 6,736,625 B1 | 5/2004 | Linglet |
| 7,407,375 B2 * | 8/2008 | Dupuis et al. ................. 425/182 |
| 2006/0068048 A1 | 3/2006 | Koda et al. |

FOREIGN PATENT DOCUMENTS

| EP | 0 577 384 A1 | 1/1994 |
| EP | 1 588 825 A1 | 10/2005 |
| FR | 2 795 994 A1 | 1/2001 |
| JP | 11 048316 A | 2/1999 |

* cited by examiner

*Primary Examiner* — Robert B Davis
(74) *Attorney, Agent, or Firm* — Pearne & Gordon LLP

(57) ABSTRACT

A molding unit for a plant for blow-molding plastic containers (2), particularly bottles, from respective parisons (3) is equipped with an interchangeable mold (16) having at least one cavity (19) for blow-molding a respective container (2), and at least two stretching rods (33) mobile along a predetermined line (24) to engage respective parisons (3) and to axially deform the parisons (3) themselves; the stretching rods (33) being selectively mobile according to the number and/or position of the molding cavities (19) of the mold (16) mounted on the molding unit at a given time.

14 Claims, 10 Drawing Sheets

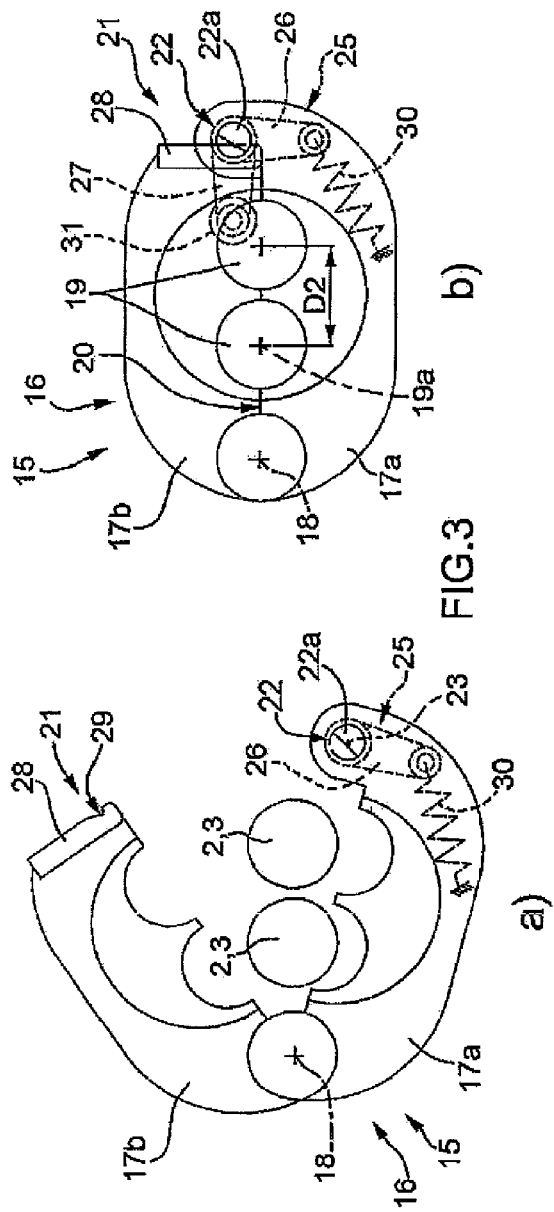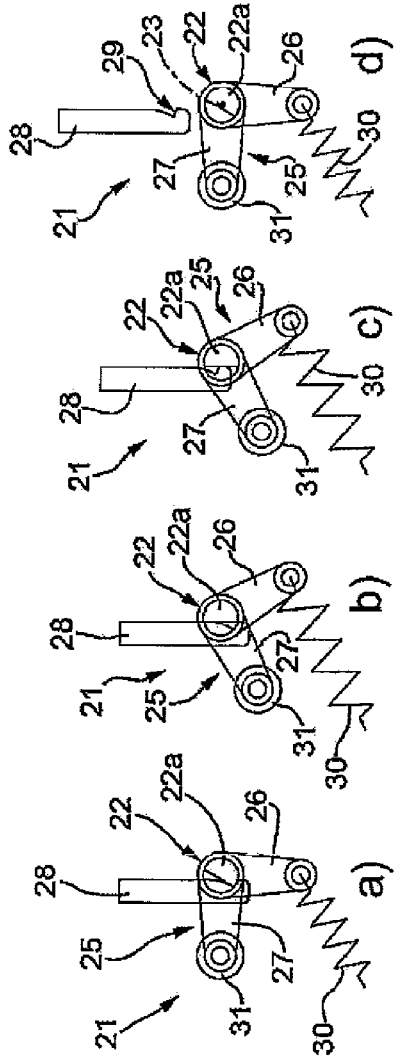

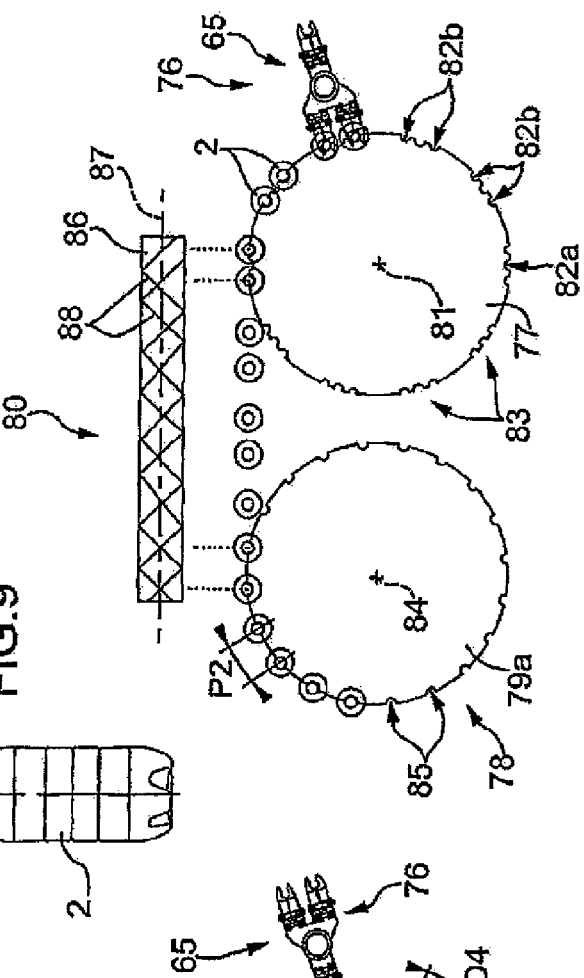
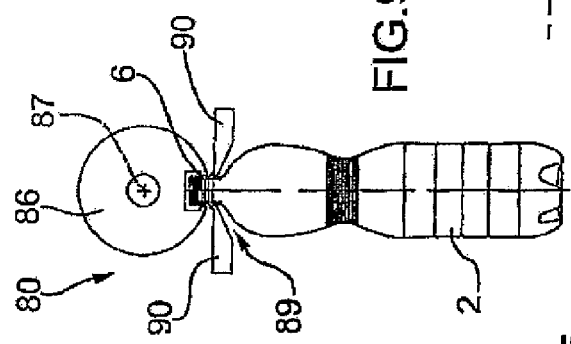
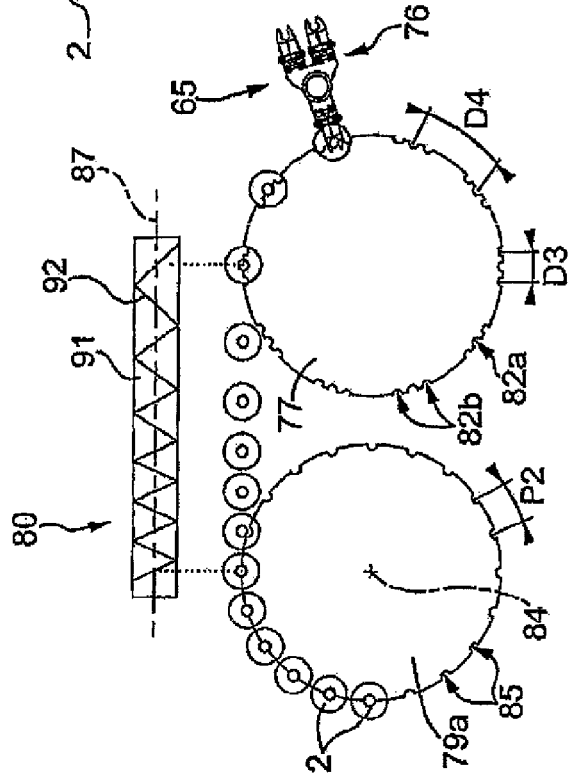

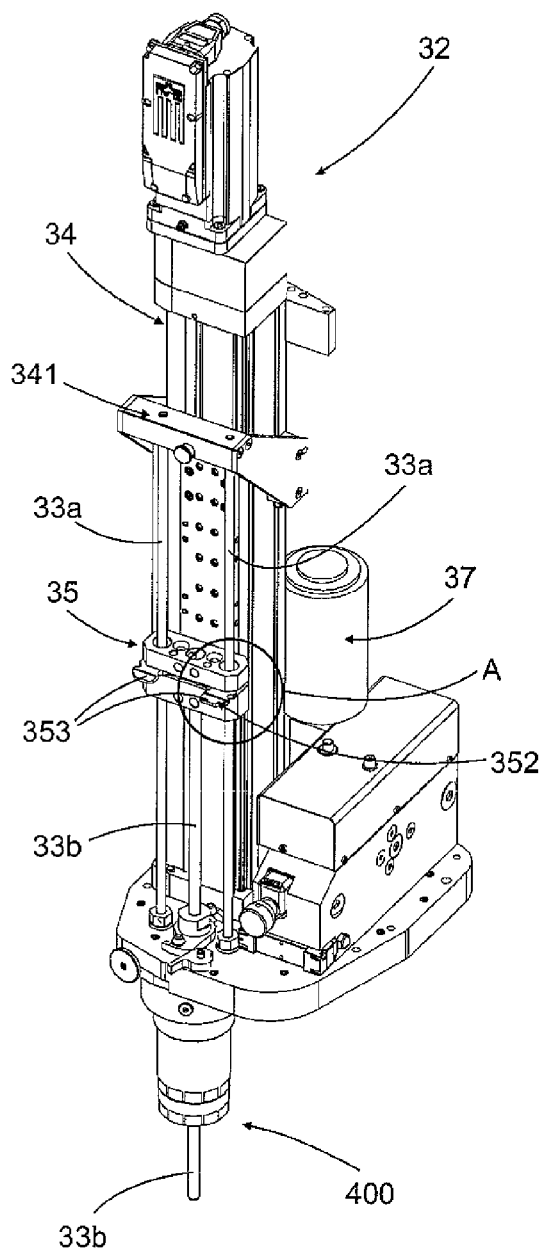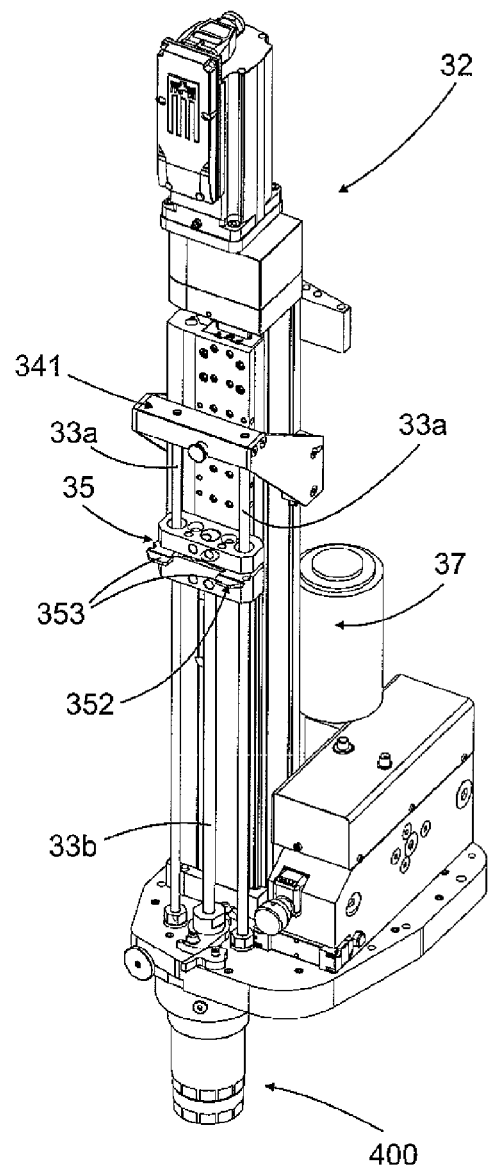
FIG.11
FIG.11a

FIG.12
FIG.12a
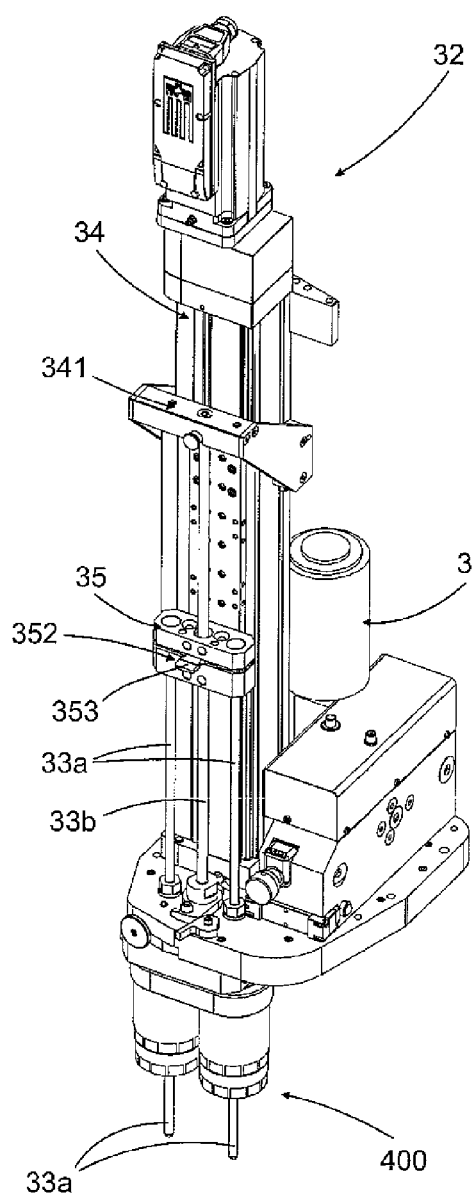
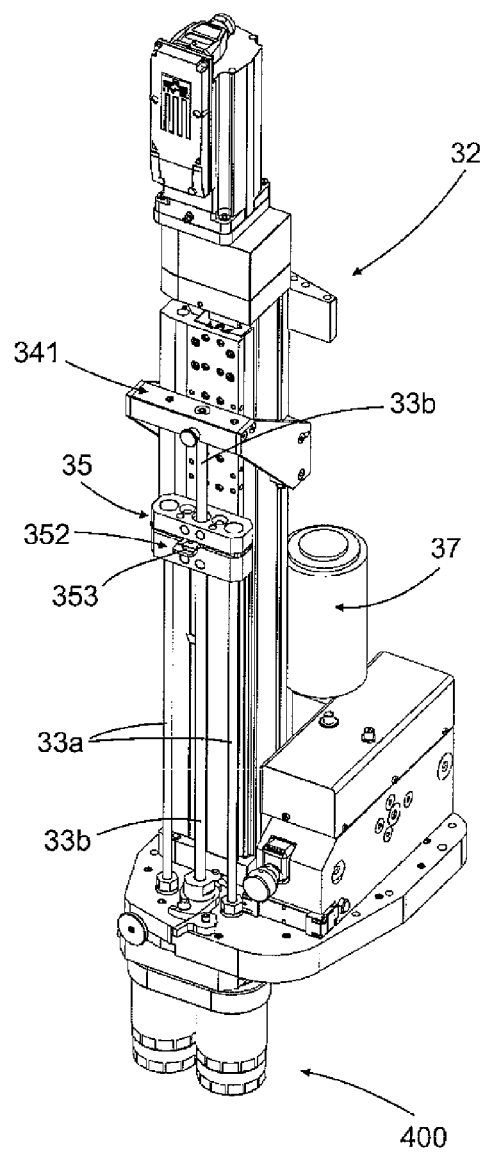

MOULDING UNIT FOR A PLANT FOR BLOW-MOULDING PLASTIC CONTAINERS, PARTICULARLY BOTTLES

TECHNICAL FIELD

This invention relates to a moulding unit for a plant for blow-moulding plastic containers, particularly bottles.

BACKGROUND ART

In the bottling industry, prior art plant for making plastic bottles comprises: a blow-moulding wheel mounted in such a way as to rotate about its longitudinal axis and equipped with at least one moulding unit, which is fed by the blow-moulding wheel around this axis and which is equipped with an interchangeable mould having at least one cavity for blow-moulding a bottle from a respective parison.

The moulding unit also comprises an interchangeable stretching unit comprising stretching rods which are equal in number to the number of moulding cavities of the mould mounted on the moulding unit at a given time, and each of which can move along a predetermined line to engage a respective parison and to axially deform the parison itself.

Prior art moulding units of the above type have several drawbacks due mainly to the fact that substituting the mould means, each time, also substituting the stretching unit, creating serious difficulties for personnel in charge, which in turn means relatively long plant set-up times.

Also known, from patent document FR2795994, is a technical solution which allows the stretching unit to be adapted to moulds with one or, alternatively, two moulding cavities. In this solution, the stretching rods, besides being movable longitudinally in order to interact with the parisons by stretching them, are also movable transversally towards and away from each other. In this way, the stretching rod can be positioned transversally in such a way as to be aligned with the mould.

This solution, however, has the disadvantage of unduly complicating the stretching unit to allow the rod position to be transversally adjusted in the correct manner.

Moreover, this solution makes it difficult to replace a blow-moulding cylinder with one having a different number of moulding cavities (to enable stretching of a different number of parisons).

Aim of the Invention

This invention has for an aim to provide a moulding unit for a blow-moulding plant for making plastic containers, particularly bottles, that is free of the above mentioned disadvantages and that is simple and inexpensive to implement.

Accordingly, this invention provides a moulding unit for a plant for blow-moulding plastic containers, particularly bottles, as described in the appended claims.

More specifically, this invention provides a moulding unit for making plastic containers from respective parisons and comprising:

a mould having at least one cavity for blow-moulding a respective container and being interchangeable with another mould having a different number of moulding cavities;

a mounting frame;

at least two stretching rods coupled to the mounting frame to move in a line along which the rods themselves extend so as to engage and longitudinally deform respective parisons housed in the at least one moulding cavity;

a mounting slider designed to be coupled to the stretching rods and which is movable longitudinally relative to the mounting frame and connected to an actuator that longitudinally moves the stretching rods coupled to it.

According to the invention, the moulding unit also comprises, in combination:

fastening means for fixing a sub-assembly of the at least two rods to the mounting frame in a raised position where it does not interfere with the parisons;

selective coupling means for connecting to the slider the remaining rods located in a lowered operating position, leaving the slider free to slide longitudinally relative to said sub-assembly.

This advantageously allows containers of different sizes to be blow-moulded (using moulding units with different numbers of moulding cavities) in a particularly efficient manner, making it easy to adapt the moulding unit (and in particular the stretching unit) during changeover.

In fact, according to the invention the stretching rods that will not be used can be placed in a position of non-interference and only the stretching rods that will be used are set to a configuration suitable for the selected size of the containers to be blow-moulded.

In particular, the longitudinal line is the vertical, the direction of longitudinal movement towards the parisons is the downward movement and the direction of longitudinal movement away from the parisons is the upward movement.

The moulding unit preferably comprises a single actuator for moving the stretching rods along said line, the coupling means being designed to selectively couple the stretching rods to the actuator.

The coupling means also comprise, in combination:

a stop defined by the slider and interacting with a portion (in particular, a protruding or enlarged portion) of an upper end of the rods located in the lowered operating position to prevent them from moving closer to the parisons relative to the plate;

a locking element that can be coupled to the slider for securing the sub-assembly of rods and operating on the upper end of the rods to prevent them from moving longitudinally away from the parison.

Preferably, the locking element is a plate shaped in such a way as to form at least one succession of protrusions and recesses and designed to be inserted into an opening formed by the slider in such a way that the recesses are longitudinally aligned with the rods of the sub-assembly and the protrusions are aligned longitudinally with the remaining rods, holding them at the top.

More preferably, the plate is shaped in such a way as to form two different successions of protrusions and recesses on opposite sides of a central portion.

This makes it much easier and quicker to adapt the moulding unit during changeover operations.

The fastening means further comprise a plurality of elastic locking elements, equal in number to the number of rods, designed to fix the rods to the frame in response to pressure applied to them by an upper end of the rods.

This allows the stretching rods (or rather, the stretching rods that are not going to be used) to be held in the raised position very easily and without risks for the operator, without having to use ladders but by simply manipulating portions of the rods within arm's reach from a height accessible to any operator.

In particular, when changing over from a size requiring a single moulding cavity to a size requiring two moulding cavities, or vice versa, the blow-moulding unit comprises three stretching rods, of which two form a first unit and the third forms a second unit, the sub-assembly comprising the first unit or the second unit, alternately.

The moulding unit also comprises a blow-moulding nozzle integral with the frame and connected to a source of pressurized fluid to be blown into the mould cavities. The nozzle is interposed between the mould and the stretching rod mounting frame.

Preferably, an upper wall of the nozzle constitutes an element for locking a lower end of the stretching rods of the sub-assembly to prevent them from moving longitudinally towards the parisons.

This further increases the strength and safety of the blow-moulding unit. The invention also relates to a blow-moulding line (that is, a blow-moulding machine) for making plastic containers (in particular bottles) from respective parisons and comprising a plurality of the moulding units.

The invention also provides a method for changing over a plant for blow-moulding plastic containers from respective parisons from making containers of one size to making containers of a different size.

The method comprises the steps of:

replacing a first mould having at least one cavity for blow-moulding a respective container with a second mould having a different number of moulding cavities;

adapting a stretching unit having at least two stretching rods, designed to be coupled to a mounting frame and movable in a longitudinal line along which the rods themselves extend to engage and longitudinally stretch corresponding parisons housed in the at least one moulding cavity, a mounting slide designed to be coupled to the stretching rods, movable longitudinally relative to the frame and connected to an actuator so as to longitudinally move the stretching rods coupled to it, and a blow-moulding nozzle integral with the frame and connected to a source of pressurized fluid to be blown into the mould cavities through the passages the nozzle has in a number equal to the number of mould cavities.

According to the invention, the step of adapting the stretching unit comprises the following steps:

uncoupling the rods from the slider;

longitudinally moving the rods aligned with the moulding cavities of the first mould away from the parisons and fastening the upper ends of said rods to the frame in a raised position where they do not interfere with the parisons;

replacing the blow-moulding nozzle with another blow-moulding nozzle having a number of fluid passages equal to the number of moulding cavities of the second mould;

disengaging the stretching rods aligned with the moulding cavities of the second mould from the frame and moving them longitudinally towards the parisons to a lowered operating position;

selectively coupling to the slider the rods located in said lowered operating position, leaving the slider free to slide longitudinally relative to the rods located in the raised position.

When the stretching rods are in the lowered position, their upper ends are preferably located at the slider.

Also, the stretching rods are fastened to the mounting frame by a combined upward and turning movement.

BRIEF DESCRIPTION OF THE DRAWINGS

The invention will now be described with reference to the accompanying drawings which illustrate a preferred, non-limiting embodiment of it and in which:

FIG. 3 is a schematic plan view, with some parts cut away for clarity, of a first detail from FIG. 2, shown in two different operating conditions;

FIG. 4 is a schematic plan view, with some parts cut away for clarity, of a detail from FIG. 3, shown in four different operating conditions;

FIG. 8 is a schematic plan view, with some parts cut away for clarity, of a second detail of the plant of FIG. 1;

FIG. 9 is a schematic side view, with some parts cut away for clarity, of the detail of FIG. 8; and FIG. 10 is a schematic plan view, with some parts cut away for clarity, of another embodiment of the detail of FIGS. 8 and 9;

FIG. 11 illustrates the detail of FIG. 5b in a perspective view;

FIG. 11a illustrates the detail of FIG. 11, with the stretching unit in a different operating configuration;

FIG. 12 illustrates the detail of FIG. 5a in a perspective view;

FIG. 12a illustrates the detail of FIG. 12, with the stretching unit in a different operating configuration;

DETAILED DESCRIPTION OF THE PREFERRED EMBODIMENTS OF THE INVENTION

Figure 1:
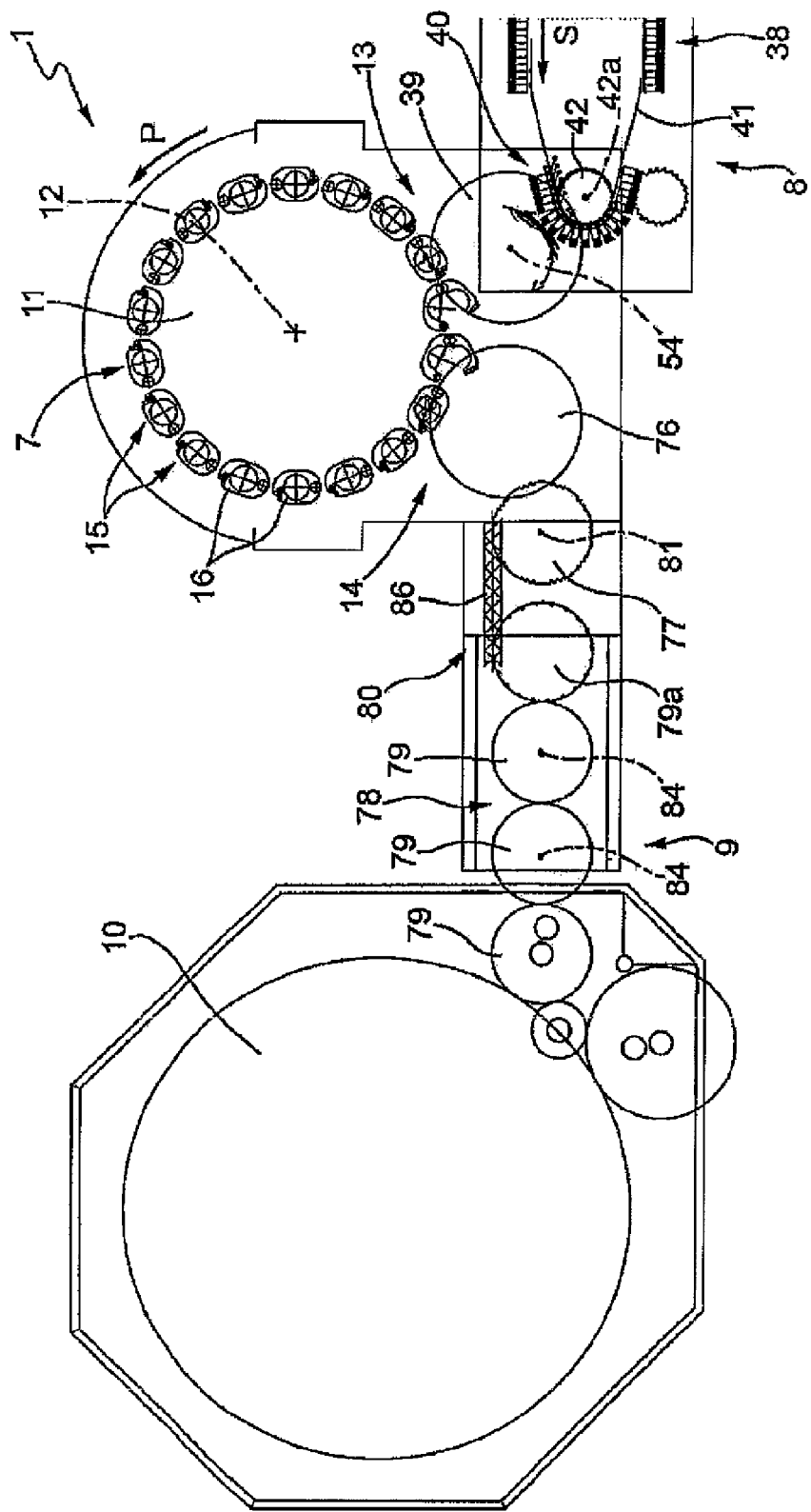
FIG. 1 is a schematic plan view, with some parts cut away for clarity, of a preferred embodiment of the plant according to the invention.

With reference to FIG. 1, the numeral 1 denotes in its entirety a plant for blow-moulding plastic containers, in this particular case, plastic bottles 2 (FIG. 9), from respective parisons 3 of known type (FIG. 5), each of which comprises an elongated cup-shaped body 4 having an externally threaded open end 5, and an annular neck 6 extending radially outwards from the outside surface of the body 4 itself.

The plant 1 comprises a blow-moulding machine 7 for blow-moulding the bottles 2, a line 8 for feeding the parisons 3 to the machine 7, and a line 9 for feeding the bottles 2 from the machine 7 to a customary filling machine 10.

Figure 2:
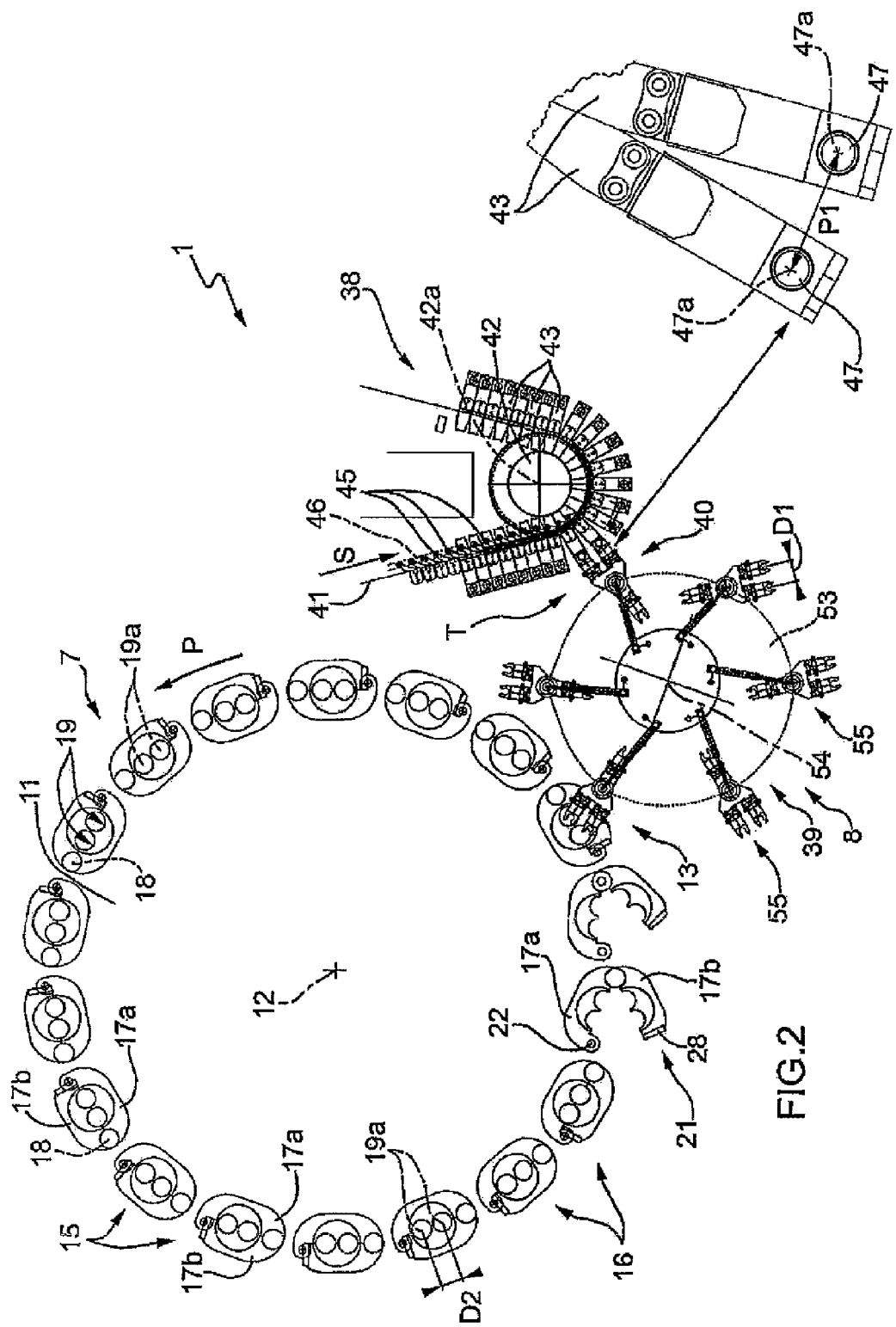
FIG. 2 is a schematic plan view, with some parts enlarged and others cut away for clarity, of a first detail of the plant of FIG. 1.

As illustrated in FIGS. 1 and 2, the machine 7 comprises a blow-moulding wheel 11 mounted in such a way as to rotate continuously (counterclockwise in FIGS. 1 and 2) about its longitudinal axis 12, which is substantially vertical and at right angles to the drawing plane of FIGS. 1 and 2. The wheel is connected to the lines 8 and 9 at a first and a second transfer station 13, 14, respectively, and is equipped with a plurality of moulding units 15 which are mounted round the edge of the wheel 11, are uniformly distributed around the axis 12 according to a predetermined spacing, and are advanced by the wheel 11 along a circular path P around the axis 12 and through the stations 13, 14.

Each unit 15 comprises an interchangeable mould 16 comprising, in the embodiment illustrated in FIGS. 2 and 3, two half-moulds 17, each hinged to the wheel 11 to rotate relative to the wheel 11, under the action of a drive device (not illustrated) about a substantially vertical pivot axis 18 parallel to the axis 12 between a position for opening (FIG. 3a) and a position for closing (FIG. 3b) two moulding cavities 19, each having the shape of a bottle 2 and a longitudinal axis 19a parallel to the axis 18, being open to the outside at a hole at the top of it smaller in diameter than the neck 6 of a parison 3, and acting in conjunction with a pneumatic device of known type, not illustrated, designed to blow compressed air into the parison 3 inside the cavity 19 to mould the respective bottle 2.

The two half-moulds 17 are oriented in such a way that they are closed in a closing plane 20 substantially tangent to the path P and are locked in position by a locking device 21 comprising a cylindrical rod 22 having a longitudinal axis 23 parallel to the axis 12, extending through one of the two half-moulds 17 (hereinafter denoted by the reference 17a) along a vertical line 24 and being rotatably coupled to the half-mould 17a to rotate, relative to the half-mould 17a, about the axis 23 itself.

The rod 22 comprises at least one undercut portion 22a limited by a flat face parallel to the axis 23, and has keyed to it a rocker arm 25 mounted coaxially with the axis 23 and in turn comprising two arms 26, 27 which extend radially outwards from the axis 23 itself.

The device 21 also comprises a latch 28, elongated in shape, which extends transversally to the line 24, is fixed to the other half-mould 17 (hereinafter denoted by the reference 17b), and has an indent 29 formed on the latch 28 along the line 24 to receive and retain the portion 22a.

During the movement of the unit 15 from the station 13 to the station 14, the two half-moulds 17a, 17b are in their closed position, and a spring 30, interposed between the arm 26 and the half-mould 17a holds the rod 22 and the latch 28 in a normally locked position (FIG. 4a), where the portion 22a engages the indent 29 to prevent the mould 16 from opening.

During the movement of the unit 15 from the station 14 to the station 13, the rod 22 is moved against the action of the spring 30 to a released position (FIG. 4b), where the portion 22a disengages the indent 29 to enable the two half-moulds 17a, 17b to move (FIGS. 4c and 4d) to the open position by engaging a tappet roller 31 mounted on the arm 27 in a cam (not illustrated) designed to control the angular position of the rocker arm 25 around the axis 23.

In connection with the above, it should be noted that the two half-moulds 17a, 17b move relative to each other through different angles between the open and closed positions of the mould 16. More specifically, the angle of movement of the half-mould 17 located radially towards the outside of the path P, namely, the half-mould 17b, is greater than the angle of movement of the half-mould 17 located radially towards the inside of the path P, namely, the half-mould 17a.

Figure 5:
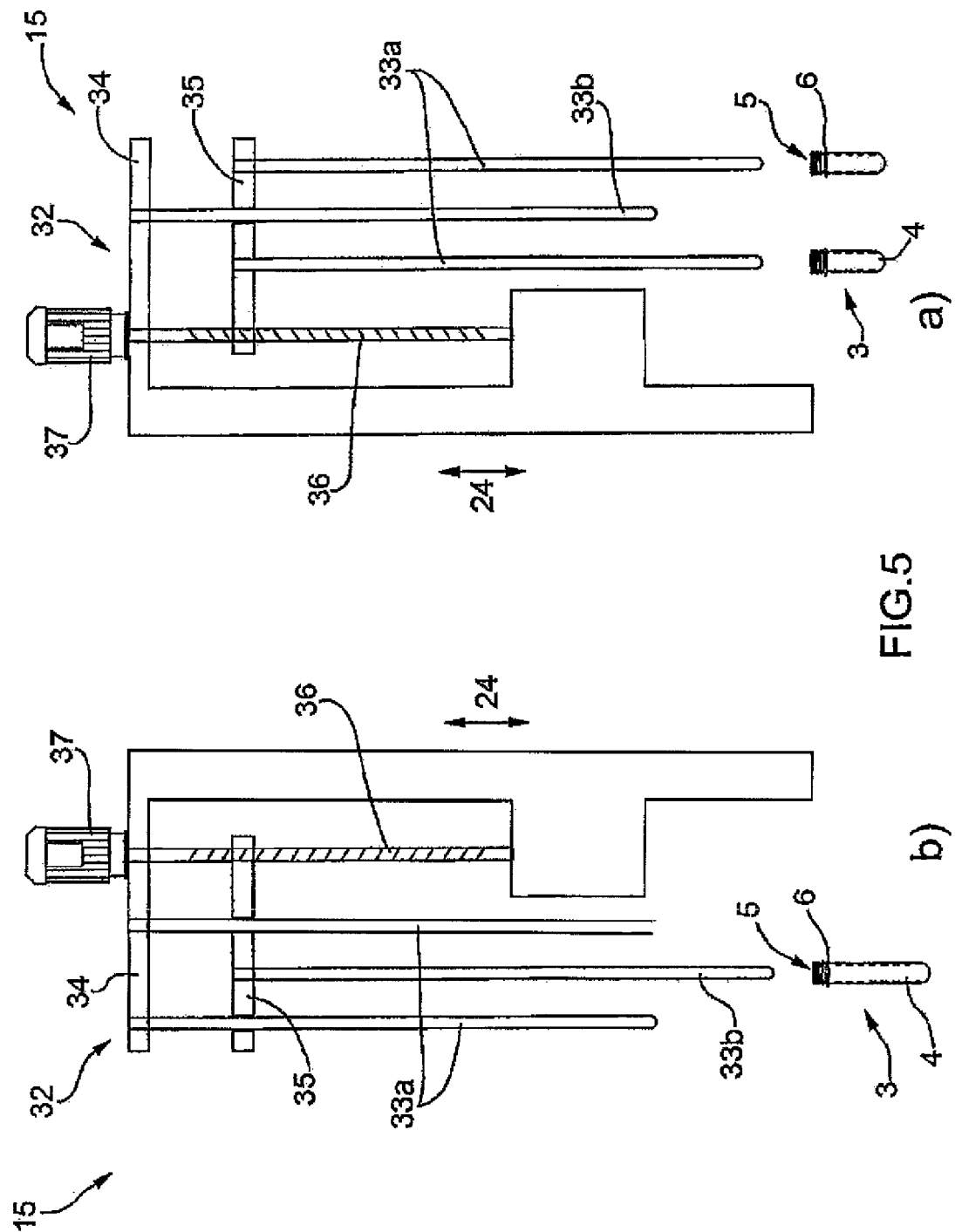
FIG. 5 is a schematic side view, with some parts cut away for clarity, of a second detail from FIG. 2, shown in two different operating conditions.

With reference to FIG. 5, the unit 15 also comprises a stretching unit 32, mounted above the mould 16 and, in this particular embodiment, comprising three stretching rods 33 parallel to each other and to the line 24 (which is, in particular a vertical line), two of which (hereinafter denoted by the reference 33a) are mounted in a position coaxial with the cavities 19, and the other (hereinafter denoted by the reference 33b) extends between the rods 33a.

The rods 33a, 33b are slidably coupled to both a mounting bracket 34 (constituting the frame for mounting the stretching rods) fixed to the wheel 11, and to a mounting plate 35 (i.e. a mounting slider 35) that is in turn coupled by a lead nut and screw mechanism to an output shaft 36 of an electric motor 37 fixed to the bracket 34, and are selectively locked on the bracket 34 or on the plate 35 along the line 24 by means of customary fastening screws not illustrated.

It should be noted that the plate 35, in particular, constitutes a slider 35 that is movable in the longitudinal line along which the stretching rods 33 extend (that is, in particular, movable vertically).

As illustrated in FIG. 5a, when the moulds 16, that is to say, the moulds with two moulding cavities 19, are mounted on the wheel 11, the rod 33b is locked axially on the bracket 34 and the rods 33a are locked axially on the plate 35 and are driven by the motor 37 along the line 24 between respective raised positions (FIG. 5a), where the rods 33a are positioned substantially outside the respective parisons 3, and respective lowered positions (not illustrated), where the rods 33a engage the respective parisons 3 in such a way as to stretch them axially along the line 24.

As illustrated in FIG. 5b, when the moulds 16 are replaced with moulds (not illustrated) having a single central moulding cavity each, for blow-moulding a bottle 2 of larger size, the rods 33a are locked axially on the bracket 34 and the rod 33b is locked axially on the plate 35 and is driven by the motor 37 along the line 24 between a raised position (FIG. 5b), where the rod 33b is positioned substantially outside the respective parison 3, and a lowered position (not illustrated), where the rod 33b engages the respective parison 3 in such a way as to stretch it axially along the line 24.

It may be inferred from the foregoing that changing the moulds of the blow-moulding units 15 does not necessitate changing the related stretching units 32 and that setup times are therefore relatively short.

In an embodiment that is not illustrated, when the wheel 11 mounts the moulds 16, that is to say, the moulds with two moulding cavities 19, the rod 33b must be removed and, when the moulds 16 are replaced with moulds (not illustrated) having a single central moulding cavity each, the rods 33a must be removed.

As regards the stretching unit 32, again with reference to FIG. 5, but with particular reference to FIGS. 11-14, attention is drawn to the following.

There are at least two stretching rods. Preferably, the number of stretching rods is equal to the number of separate axes defined by the cavities of the moulds that can be used in the moulding unit (for the different container sizes to be blow-moulded).

The stretching rods 33 are designed to be coupled to the mounting frame 34 to move along the longitudinal line 24 along which the rods themselves extend so as to engage and longitudinally deform respective parisons 3 housed in the at least one moulding cavity 19;

The mounting slider 35 is designed to be selectively coupled to the stretching rods 33 and is movable longitudinally relative to the mounting frame 34; in particular, the slider 35 is connected to an actuator 37 that longitudinally moves the stretching rods 33 coupled to it.

In the preferred embodiment illustrated, the slider 35 longitudinally provides a number of through holes equal to the number of stretching rods 33 (in particular, it provides three through holes).

At each of the through holes, the slider 35 also has a stop 351 (or any other constraining element) designed to interact with an upper end of the rods 33, when these are located in a lowered operating position, to prevent them from moving closer to the parisons 3 relative to the slider 35 (that is, from moving vertically downwards).

In the light of the above, it should be noted that each rod 33 has, at its upper end, a protruding or enlarged portion 331 (preferably also provided with an elastic element, for example made of rubber) designed to interact with the stop 351 of the slider 35.

The moulding unit also comprises a locking element 352 that can be coupled to the slider 35 for (selectively) securing some of the rods 33; the locking element 352 operates on the upper end of the rods 33 to prevent them from moving longitudinally away from the parison 3 (that is to say, to prevent the rod 33 from moving longitudinally upwards relative to the slider 35) without constraining the other rods 33; in that way, the slider 35 is free to slide longitudinally relative to the remaining rods and is limited only by the stops 351.

According to the invention, the mounting frame 34 comprises a portion 341 (shaped preferably like a bracket) forming a plurality (in particular, equal in number to the number of rods 33) of hooking slots (not illustrated) or cavities designed to receive the upper ends of the rods 33 and hold them in the raised position, fixed to the frame 34 (that is, to the bracket 341, which is positioned above the slider 35, typically at a height of more than two metres from the supporting base of the blow-moulding machine).

Each rod 33 can be hooked up to the frame (that is, to the frame 341) individually and preferably independently of the other rods 33.

For this purpose, the moulding unit comprises fastening means for fixing a sub-assembly of rods 33 to the frame 34 in a raised position where it does not interfere with the parisons 3.

Preferably, the fastening means comprise a plurality of elastic locking elements (not illustrated, in particular located in the hooking cavities) equal in number to the number of rods 33, designed to fix the rods to the frame in response to pressure applied to them by an upper end of the rods.

Preferably, the locking elements are designed in such a way as to allow the stretching rods 33 to be hooked to the frame 34 (that is, to the hooking slots of the bracket 341) by simultaneously lifting and turning the rods 33.

Further, the slider 35 and the locking element 352 constitute selective coupling means for connecting to the slider 35 (thereby connecting to the actuator 37) the remaining rods located in a lowered operating position, leaving the slider 35 free to slide longitudinally relative to the rods of the sub-assembly.

The locking element 352 is preferably in the form of a plate designed to coupled to the slider 35 preferably by inserting the plate 352 into an opening (or gap) formed on the slider 35.

Preferably, the plate 352 slots into the gap in the slider 35 with an interference fit so as to make the coupling more secure.

The plate 352 is shaped in such a way as to form at least one succession of protrusions 353 and recesses 354 arranged in such a way that, when the plate 352 is slotted in the gap in the slider 35, the recesses 354 are longitudinally aligned with the rods 33 of the sub-assembly (that is, those fastened to the frame 34 in the raised position of non-interference) and the protrusions 353 are aligned longitudinally with the remaining rods (that is, those in the lowered operating position), holding them at the top.

Thus, coupling the plate 352 to the slider 35 means that when the slider is driven downwards by the actuator 37, the rods 33 that are in the lowered operating position are forced (or dragged) as one along with it, since the protrusions 353 press against the upper ends of the respective rods 33.

At the same time, the rods 33 that are in the raised position are not constrained by the plate 352 and so the slider 35 is free to move vertically, forming (with its through holes) a guide for these rods which do not move longitudinally during the movement of the slider 35.

Preferably, the plate 352 is shaped in such a way as to form two different successions of protrusions and recesses on opposite sides of a central portion 355.

In particular, in the embodiment illustrated, the plate 352 is shaped in such a way as to form:

a first succession comprising a central recess 354 interposed between two protrusions 353 (to lock the rods 33a designed to stretch a pair of parisons housed in a pair of cavities in a mould which makes pairs of bottles;

a second succession comprising a central protrusion 353 interposed between two recesses 354 (to lock the rod 33b designed to stretch a parison housed in the cavity of a mould which makes single bottles).

This advantageously allows use of the same plate 352 for both blow-moulded container sizes. When changing over from one size to another, the plate 352 can simply be pulled out, turned by 180 degrees and slotted back into the gap in the slider 35.

Thus, in the embodiment illustrated, the moulding unit comprises three stretching rods 33, of which two form a first rod unit 33a and the third forms a second rod unit 33b, the sub-assembly of rods (hooked to the frame 34 in the raised position) comprising the first rod unit 33a or the second rod unit 33b, alternately.

The moulding unit also comprises a blow-moulding nozzle 400 integral with the frame 34 and connected to a source (of customary type and not illustrated) of pressurized fluid to be blown into the cavity 19 of the mould 16.

The nozzle 400 forms one or more passages for the fluid to be blown into the cavities 19; the passages in the nozzle 400 are equal in number to the number of mould 16 cavities 19.

Preferably, an upper wall of the nozzle constitutes an element for locking a lower end of the stretching rods 33 of the sub-assembly (that is, those in the raised position of non-interference with the parisons 3) to prevent them from moving longitudinally towards the parisons 3.

It should be noted that the invention also provides a blow-moulding line (that is, a blow-moulding machine) for making plastic containers 2 from respective parisons 3 and comprising a plurality of moulding units as described above.

The invention also provides a method for changing over a plant for blow-moulding plastic containers 2 from respective parisons 3 from making containers of one size to making containers of a different size.

In other terms, the invention provides a method for changing over a moulding unit (that is, a line for blow-moulding plastic containers 2 from respective parisons 3) from making, or blow-moulding (stretching and then blowing) containers of one size to making containers of a different size.

The method comprises the following steps:

replacing a first mould having at least one cavity for blow-moulding a respective container with a second mould having a different number of moulding cavities;

adapting a stretching unit 32 having at least two stretching rods 33, designed to be coupled to a mounting frame 34 and movable in the longitudinal line 24 along which the rods themselves extend to engage and longitudinally stretch corresponding parisons 3 housed in the at least one moulding cavity 19, a mounting slide 35 designed to be coupled to the stretching rods 33, movable longitudinally relative to the frame 34 and connected to an actuator 37 so as to longitudinally move the stretching rods 33 coupled to them, and a blow-moulding nozzle integral with the frame 34 and connected to a source of pressurized fluid to be blown into the mould 16 cavities 19 through the passages the nozzle has in a number equal to the number of mould 16 cavities 19.

According to the invention, the step of adapting the stretching unit comprises the following steps:

uncoupling the rods 33 from the slider 35 (preferably by removing the plate 352 from the gap in the slider 35);

longitudinally moving the rods 33 aligned with the moulding cavities 19 of the first mould (that is, the rods of the above mentioned sub-assembly) away from the parisons (that is to say, lifting the rods) and fastening the upper ends of said rods to the frame 34 in a raised position where they do not interfere with the parisonsc 3;

replacing the blow-moulding nozzle 400 with another blow-moulding nozzle having a number of fluid passages equal to the number of cavities 19 of the second mould 16;

disengaging the stretching rods 33 aligned with the moulding cavities of the second mould from the frame 34 and moving them longitudinally towards the parisons 3 to a lowered operating position;

selectively coupling to the slider 35 the rods 33 located in said lowered operating position, leaving the slider 35 free to slide longitudinally relative to the rods located in the raised position; when the stretching rods 33 are in the lowered position, their upper ends are preferably located at the slider 35, that is, the upper end of each is tangent to the gap formed in the slider 35.

Preferably, the stretching rods 33 are fastened to the mounting frame 34 (in particular to the bracket 341) by a combined upward and turning movement of the rods, as described above in connection with the moulding unit.

With reference to FIGS. 1 and 2, the feed line 8 comprises a heating device 38 for thermally conditioning the plastic material the parisons 3 are made of to a temperature greater than their glass transition temperature, and a transfer wheel 39 connected to the device 38 at a transfer station 40 and to the blow-moulding wheel 11 at the station 13.

The device 38 comprises an endless chain conveyor 41 that is trained around two pulleys 42 (only one of which is illustrated in FIGS. 1 and 2) rotatably mounted to turn about respective longitudinal axes 42a parallel to the line 24, extends through at least one customary oven not illustrated, and mounts a plurality of pick-up and transporting members 43 uniformly distributed along the conveyor 41 and advanced by the conveyor 41 itself along an annular path S.

Figure 6:
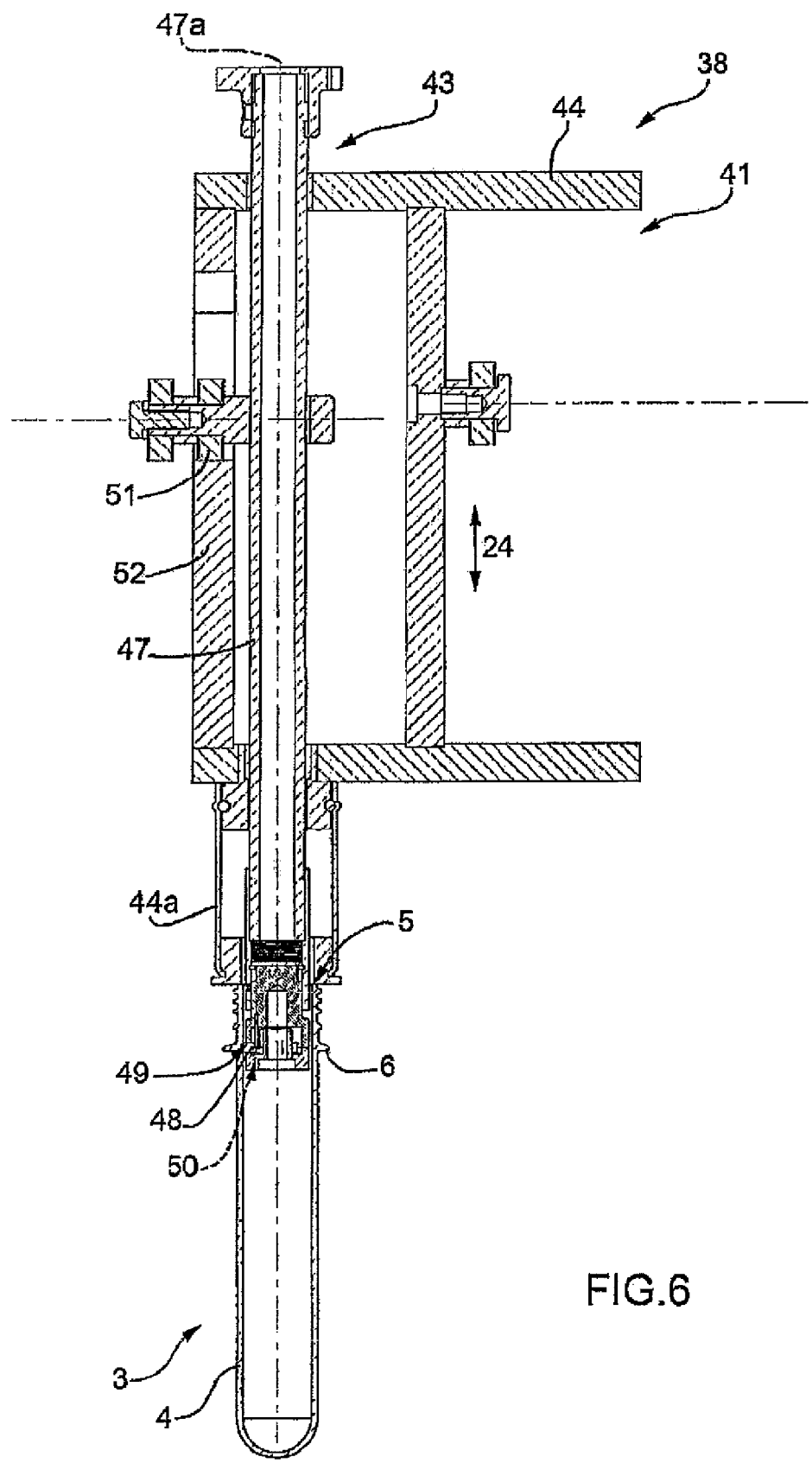
FIG. 6 is a schematic side view, with some parts cut away for clarity, of a third detail from FIG. 2.

As illustrated in FIGS. 2 and 6, each member 43 comprises a tubular guide element 44 that is hooked up to the conveyor 41, extends along the line 24, is held in the correct position by engagement with a tappet roller 45 at a cam 46, and is slidably engaged by a respective pick-up rod 47 whose longitudinal axis 47a is parallel to the line 24.

The rod 47 is equipped with a plurality of balls 48 that are uniformly distributed around the axis 47a, are seated in respective housings 49 formed radially on a bottom end of the rod 47 protruding to the outside of the element 44, and protrude radially outwards from the respective housings 49 under the pushing action of respective springs 50 mounted inside the respective housings 49 transversally to the line 24.

The rod 47 is mobile under the pushing action of a tappet roller 51 placed in contact with a cam 52, along the line 24 between a lowered position (not illustrated), where the rod 47 extends inside the respective parison 3 to allow the balls 48 to grip the parison 3 under the pushing action of the respective springs 50, and a raised position (FIG. 6), where the rod 47 disengages the parison 3.

The member 43 further comprises an interchangeable limit stop block 44a that protrudes downwardly from the element 44 coaxially with the axis 47a to come into contact with the end 5 of the parison 3, is removably mounted on the element 44, and can be replaced according to the size and/or shape of the end 5 itself.

Figure 7:
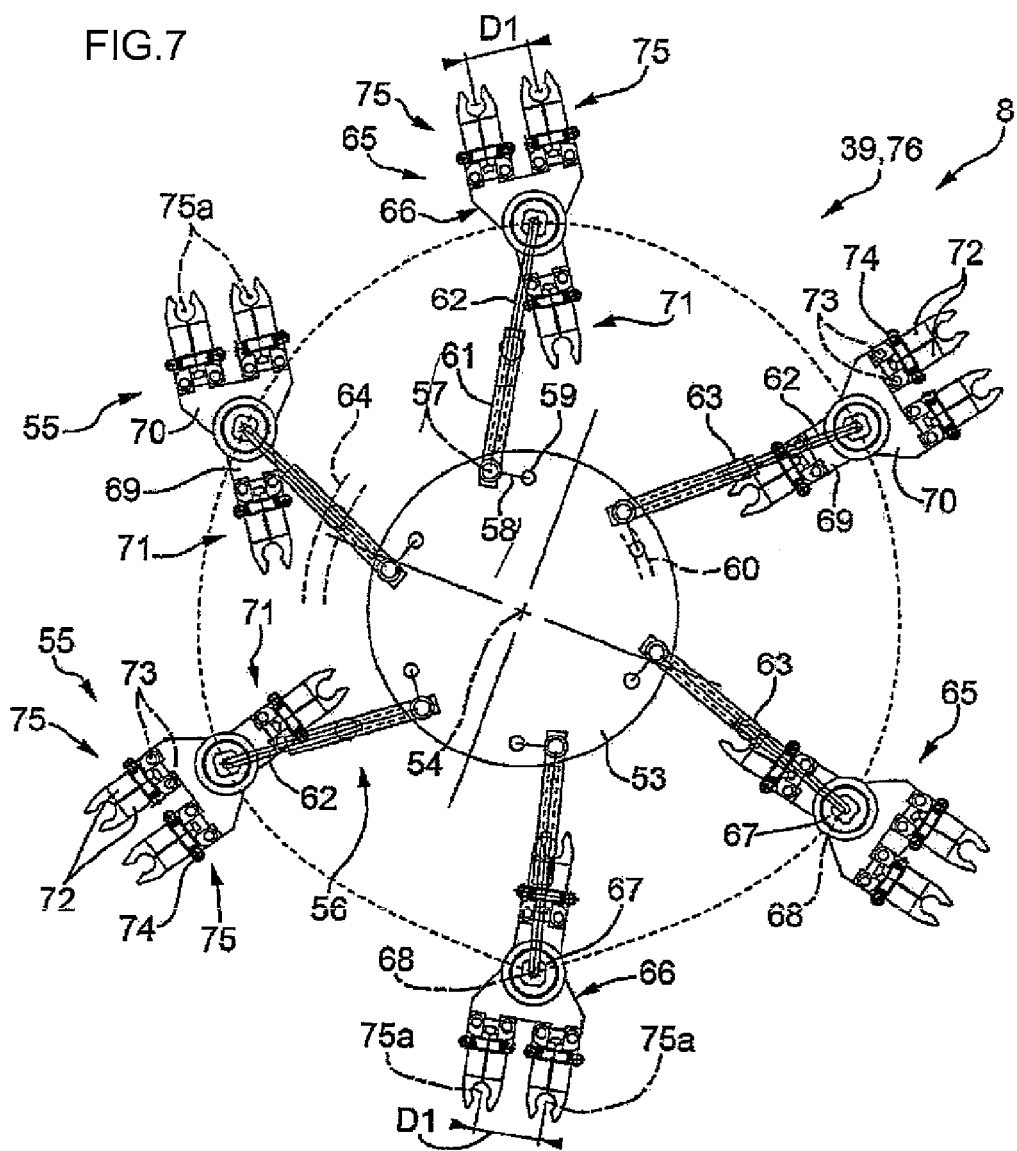
FIG. 7 is a schematic plan view, with some parts cut away for clarity, of a fourth detail from FIG. 2.
Figure 13:
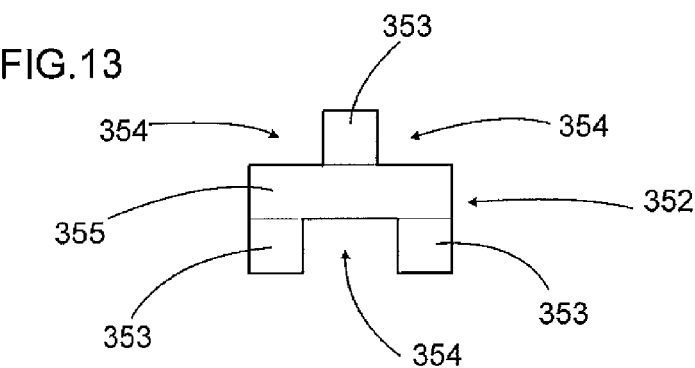
FIG. 13 schematically illustrates the stretching rod locking element in a plan view.
Figure 14:
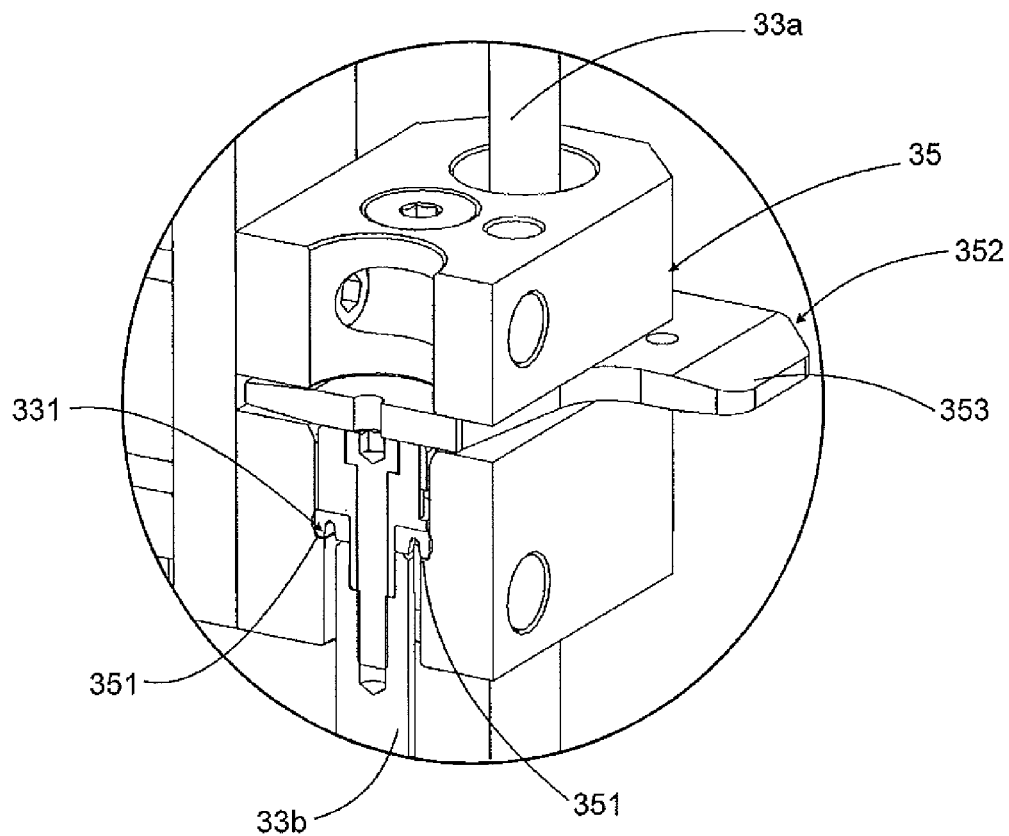
FIG. 14 is an enlargement of the detail A of FIG. 11 in a cutaway perspective view.

With reference to FIGS. 2 and 7, the wheel 39 comprises a drum 53 mounted to turn continuously about its substantially vertical longitudinal axis 54 parallel to the line 24, and a plurality of pick-up and transporting units 55 (in this particular embodiment six pick-up and transporting units 55) that are mounted along a peripheral edge of the drum 53, protrude radially outwards from the drum 53, and are advanced by the drum 53 itself around the axis 54 and through the stations 13 and 40.

Each unit 55 comprises a supporting rocker arm 56 that is hinged to the drum 53 to turn relative to the drum 53 itself about a pivot axis 57 substantially parallel to the line 24, and is equipped, at its first arm 58, with a tappet roller 59 in contact with a cam 60 designed to control the angular position of the rocker arm 56 around the axis 57 itself.

The rocker arm 56 also comprises a second, elongated arm 61 slidably engaged by a slider 62 that is equipped with a tappet roller 63 in contact with a cam 64 designed to control the position of the slider 62 along the arm 61, and supports at a free end of it, protruding to the outside of the arm 61 itself, a pick-up unit 65 comprising a rocker arm 66 hinged to the slider 62 to turn relative to the slider 62 and under the action, in this embodiment, of an electric motor 67 mounted on the slider 62, about a pivot axis 68 parallel to the line 24.

The rocker arm 66 has two arms 69, 70, opposite each other. The arm 69 mounts a pick-up element 71 having the shape of a fork and comprising two arms 72 which are mounted to oscillate about respective pivot axes 73 parallel to the line 24 between a position of releasing (not illustrated) and a position of clamping (FIG. 7) a respective parison 3, and which a spring 74 interposed between the arms 72 normally holds in the clamping position where the arms 72 grip the parison 3 above the neck 6.

The arm 70 mounts two pick-up elements 75 entirely equivalent to the element 71, parallel to each other and positioned side by side, having concavities facing away from the concavity of the element 71, and further having respective longitudinal axes 75a that are parallel to the line 24 and spaced from each other at a distance D1 equal to the distance D2 between the longitudinal axes 19a of the two moulding cavities 19 of one mould 16.

In connection with the above, it should be noted that:

according to the number of moulding cavities 19 in each mould 16, the pick-up elements 71, 75 are selectively oriented by the respective electric motors 67 about the respective axes 68 between respective operating positions where the pick-up elements 71, 75 are oriented towards the outside of the wheel 39, and respective rest positions where the pick-up elements 71, 75 are oriented towards the inside of the wheel 39;

by combining the movements of the rocker arms 56 about the respective axes 57 with the movements of the sliders 62 along the respective arms 61 and with the movements of the rocker arms 66 about the respective axes 68, the elements 71, 75 in their operating positions are kept substantially parallel to the path P at the station 13 and parallel to the path S at the station 40; and the station 40 for transferring the parisons 3 from the conveyor 41 to the wheel 39 is positioned along a curved stretch T of the path S, preferably a stretch T around one of the pulleys 42, where the spacing P1 between the rods 47, and hence between the parisons 3, is equal to the distance D1 and hence to the distance D2, and different from the spacing between the rods 47 and, hence between the parisons 3, along the straight stretches of the path S.

From the above it may be inferred that the position of the station 40 and the shape of the wheel 39 make it possible to set up the plant 1 quickly and easily not only using moulds 16 with two moulding cavities 19 but also using moulds (not illustrated) with a single moulding cavity.

In another embodiment that is not illustrated, the rocker arms 66 are eliminated and replaced with interchangeable pick-up units, each of which is hinged to the respective slider 62 to oscillate about the respective axis 68 under the control of a tappet roller engaged in a cam, and which is equipped with one pick-up element 71 or two pick-up elements 75.

As illustrated in FIG. 1, the feed line 9 comprises: a transfer wheel 76 that is connected with the wheel 11 at the station 14, is entirely equivalent to the wheel 39 and will not therefore be described in further detail; a wheel 77 for extracting the bottles 2 from the pick-up elements 71, 75 of the transfer wheel 76; and a train 78 of feed wheels 79 connected to the wheel 77 through an interposed dispensing device 80 and designed to feed the bottles 2 to the filling machine 10.

With reference to FIG. 8, the wheel 77 is mounted to rotate continuously about its longitudinal axis 81 parallel to the line 24, and is equipped with a plurality of semi-cylindrical pockets 82 formed along a peripheral edge of the wheel 77, open radially towards the outside, each designed to receive and retain a bottle 2, and divided into a plurality of groups 83 of pockets 82 equally spaced around the axis 81 and each comprising, in this particular embodiment, three pockets 82, of which one (hereinafter denoted by the reference 82a) is positioned between the other two (hereinafter denoted by the reference 82b) in turn positioned from each other at a distance D3 equal to the distances D1 and D2.

Each wheel 79 is mounted to rotate continuously about its longitudinal axis 84 parallel to the line 24, and is equipped with a plurality of semi-cylindrical pockets 85 formed along a peripheral edge of the wheel 79, open radially towards the outside, each designed to receive and retain a bottle 2, and uniformly distributed around the axis 84 according to a spacing P2 equal to the spacing of the dispensing nozzles (not illustrated) of the filling machine 10.

In this connection it should be noted that the spacing P2 is greater than the distance D3 and less than a distance D4 between two adjacent pockets 82a and that the distance D4 is also equal to the spacing between the moulds 16 on the blow-moulding wheel 11 and is therefore different from the distance D2.

As illustrated in FIGS. 8 and 9, the dispensing device 80 comprises, in this embodiment, a screw feeder 86, that is mounted to rotate continuously about its longitudinal, substantially horizontal axis 87 transversal to the line 24, extends between the wheel 77 and the infeed wheel 79 (hereinafter denoted by the reference 79a) of the train 78 of wheels 79, has two starts 88, that is to say, a number of starts equal to the number of moulding cavities 19 of one mould 16, is designed to engage the bottles 2 above the respective necks 6, and acts in conjunction with a guide channel 89 which extends parallel with the axis 87, which is slidably engaged by the bottles 2 and which is delimited by two side walls 90 designed to support the bottles 2 under the respective necks 6.

The embodiment illustrated in FIG. 10 differs from the one illustrated in the drawings described up to now only in that:

the moulds 16 with two moulding cavities 19 are eliminated and replaced with moulds (not illustrated) having only one moulding cavity;

the pick-up elements 71, 75 operate and come to rest at positions different from the above; and the screw feeder 86 is eliminated and replaced with a screw feeder 91 having a single start 92.

In an embodiment that is not illustrated, the dispensing device 80 is eliminated and replaced with a customary, variable spacing transfer wheel.

The operation of the plant 1 will now be described with reference to the moulds 16 with two moulding cavities 19 and starting from an instant where the pick-up elements 71, 75 of the transfer wheels 39, 76 have been moved to their rest and operating positions, respectively.

The conveyor 41 feeds the parisons 3 one after the other to the station 40 where the spacing P1 of the parisons 3 is equal to the distance D1 between the pick-up elements 75 of each pick-up unit 65 of the wheel 39 so that each unit 65 can pick up a pair of parisons 3 from the conveyor 41.

Each pick-up unit 65 is then advanced by the wheel 39 through the transfer station 13 in step with a respective mould 16, whose half-moulds 17a, 17b are opened at the station 14 after the respective rod 22 has been moved to the released position in order to drop the parisons 3 into the respective moulding cavities 19.

At this point, the two half-moulds 17a, 17b are closed; the rod 22 is moved by the spring 30 to the latch 28 locked position; and the bottles 2 are moulded as the mould 16 advances from the station 13 to the station 14, where the mould 16 is opened to enable the pick-up elements 75 of one pick-up unit 65 of the transfer wheel 76 to extract the bottles 2 just moulded.

After that, the bottles 2 are first transferred by the wheel 76 into the pockets 82b of one group 83 of pockets 82 on the extraction wheel 77, are then advanced by the wheel 77 to the infeed end of the channel 89 and by the screw feeder 86 along the channel 89 and, lastly, are transferred by the screw feeder 86 into the pockets 85 of the wheel 79a according to the aforementioned spacing P2.

Operation of the plant 1 with moulds (not illustrated) having a single moulding cavity involves simply replacing the moulds 16 with the other moulds, moving the pick-up elements 71, 75 of the transfer wheels 39, 76 to their operating and rest positions, respectively, and replacing the screw feeder 86 with the screw feeder 91. It should be noted that, in this case, each bottle 2 is first transferred by the wheel 76 into the pocket 82a of one group 83 of pockets 82 on the extraction wheel 77, is then advanced by the wheel 77 to the infeed end of the channel 89 and by the screw feeder 91 along the channel 89 and, lastly is transferred by the screw feeder 91 into a pocket 85 of the wheel 79a according to the aforementioned spacing P2.

From the above it may be inferred that the position of the station 40, the shape of the transfer wheels 39, 76 and the presence of the screw feeders 86, 91 make it possible to set up the plant 1 quickly and easily not only using moulds 16 with two moulding cavities 19 but also using moulds (not illustrated) with a single moulding cavity, and to feed the same filling machine 10 and according to the same spacing P2 with bottles 2 of different sizes made in moulds 16 with two moulding cavities 19 as well as in moulds (not illustrated) with a single moulding cavity.

Lastly, it should be noted that, preferably, the assembly composed of the blow-moulding wheel 11, the transfer wheels 39, 76, the extraction wheel 77 and the screw feeders 86, 91 is driven by one drive motor (not illustrated), while the chain conveyor 41 and the train 78 of feed wheels 79 may be driven either by a single drive motor (not illustrated) or, alternatively, by separate motors (not illustrated) synchronized with each other. Indeed, since the use of moulds 16 with two moulding cavities 19 confers on the blow-moulding machine 7 a production capacity that is twice the production capacity conferred on the blow-moulding machine 7 by the use of moulds (not illustrated) with a single moulding cavity, the feed speeds of the conveyor 41 and of the train 78 of feed wheels 79 are selectively controlled in such a way that when the machine 7 mounts moulds 16 with two moulding cavities 19 the speeds are substantially twice the speeds imparted to the conveyor 41 and to the train 78 of feed wheels 79 when the machine 7 mounts moulds (not illustrated) with a single moulding cavity.

The invention claimed is:

1. A blow-moulding unit for making plastic containers (2) from respective parisons (3), and comprising:
    a mould (16) having at least one cavity (19) for blow-moulding a respective container (2) and being interchangeable with another mould (16) having a different number of moulding cavities 19);
    a mounting frame (34);
    at least two stretching rods (33) coupled to the mounting frame (34) to move along a longitudinal line (24) along which the rods themselves extend so as to engage and longitudinally deform respective parisons (3) housed in the at least one moulding cavity (19);
    a mounting slider (35) designed to be coupled to the stretching rods (33) and which is movable longitudinally relative to the mounting frame (34) and connected to an actuator (37) that longitudinally moves the stretching rods (33) coupled to it;
    fastening means for fixing a sub-assembly of the at least two rods (33) to the frame (34) in a raised position where it does not interfere with the parisons (3);
    selective coupling means for connecting to the slider (35) the remaining rods located in a lowered operating position, leaving the slider (35) free to slide longitudinally relative to the rods of said sub-assembly.

2. The moulding unit according to claim 1, comprising a single actuator (37) for moving the stretching rods (33*a*, 33*b*) along the line (24), the coupling means being designed to selectively couple the stretching rods (33*a*, 33*b*) to the actuator (37).

3. The moulding unit according to claim 1, wherein the coupling means comprise, in combination:
    a stop defined by the slider (35) and interacting with a portion of an upper end of the rods (33) located in the lowered operating position to prevent them from moving closer to the parisons (3) relative to the plate (35);
    a locking element that can be coupled to the slider (35) for securing the sub-assembly of rods and operating on the upper end of the rods (33) to prevent them from moving longitudinally away from the parison (3).

4. The moulding unit according to claim 3, wherein the locking element is a plate shaped in such a way as to form at least a succession of protrusions and recesses and designed to be inserted into an opening formed in the slider (35) in such a way that the recesses are longitudinally aligned with the rods of the sub-assembly and the protrusions are aligned longitudinally with the remaining rods, holding them at the top.

5. The moulding unit according to claim 4, wherein the plate is shaped in such a way as to form two different successions of protrusions and recesses on opposite sides of a central portion.

6. The moulding unit according to claim 1, wherein the fastening means comprise a plurality of elastic locking elements, equal in number to the number of rods (33), designed to fix the rods to the frame in response to pressure applied to them by an upper end of the rods.

7. The moulding unit according to any of the foregoing claim 1, wherein the actuator (37) comprises a drive motor having an output shaft (36), the stretching rods (33) of each stretching rod sub-assembly (33*a*, 33*b*) being selectively coupled to the output shaft (36) by a lead nut and screw mechanism.

8. The moulding unit according to claim 1, comprising three stretching rods (33), of which two form a first rod unit (33*a*) and the third forms a second rod unit (33*b*), the sub-assembly of rods comprising the first rod unit (33*a*) or the second rod unit (33*b*), alternately.

9. The moulding unit according to claim 1, wherein the stretching rods (33*a*, 33*b*) are mounted removably on the moulding unit itself.

10. The moulding unit according to claim 1, comprising a blow-moulding nozzle integral with the frame (34) and connected to a source of pressurized fluid to be blown into the cavity (19) of the mould (16), an upper wall of the nozzle constituting an element for locking a lower end of the stretching rods (33) of the sub-assembly to prevent them from moving longitudinally towards the parisons (3).

11. A line for blow-moulding plastic containers (2) from respective parisons (3), comprising a plurality of moulding units, wherein the moulding units are moulding units according to claim 1.

12. A method for changing over a plant for blow-moulding plastic containers (2) from respective parisons (3), from making containers of one size to making containers of a different size, the method comprising the steps of:
    replacing a first mould (16) having at least one cavity (19) for blow-moulding a respective container (2) with a second mould (16) having a different number of moulding cavities (19);
    adapting a stretching unit having at least two stretching rods (33), designed to be coupled to a mounting frame (34) and movable in a longitudinal line (24) along which the rods themselves extend to engage and longitudinally stretch corresponding parisons (3) housed in the at least one moulding cavity (19), a mounting slide (35) designed to be coupled to the stretching rods (33), movable longitudinally relative to the frame (34) and connected to an actuator (37) so as to longitudinally move the stretching rods (33) coupled to it, and a blow-moulding nozzle integral with the frame (34) and connected to a source of pressurized fluid to be blown into the mould (16) cavities (19) through the passages the nozzle has in a number equal to the number of mould (16) cavities (19),
wherein the step of adapting the stretching unit comprises the following steps:
    uncoupling the rods (33) from the slider (35);
    longitudinally moving the rods aligned with the moulding cavities of the first mould away from the parisons and fastening the upper ends of said rods to the frame (34) in a raised position where they do not interfere with the parisons (3);
    replacing the blow-moulding nozzle with another blow-moulding nozzle having a number of fluid passages equal to the number of cavities (19) of the second mould (16);
    disengaging the stretching rods (33) aligned with the moulding cavities of the second mould from the frame (34) and moving them longitudinally towards the parisons (3) to a lowered operating position;
    selectively coupling to the slider (35) the rods (33) located in said lowered operating position, leaving the slider (35) free to slide longitudinally relative to the rods located in the raised position.

13. The method according to claim 12, wherein the upper ends of the stretching rods (33), when the latter are in the lowered position, are located at the slider (35).

14. The method according to claim 12, wherein the stretching rods (33) are fastened to the mounting frame (34) by a combined upward and turning movement.

* * * * *

UNITED STATES PATENT AND TRADEMARK OFFICE
CERTIFICATE OF CORRECTION

PATENT NO. : 8,425,220 B2  
APPLICATION NO. : 13/055749  
DATED : April 23, 2013  
INVENTOR(S) : Maurizio Borgatti Page 1 of 1

It is certified that error appears in the above-identified patent and that said Letters Patent is hereby corrected as shown below:

In the Claims:

In column number 13, line number 65, in line 1 of Claim 7, please delete: "any of the foregoing".

Signed and Sealed this  
Sixteenth Day of July, 2013

Teresa Stanek Rea  
*Acting Director of the United States Patent and Trademark Office*